July 19, 1938.  E. KOTTSIEPER  2,124,196
ENGINE
Filed May 18, 1933
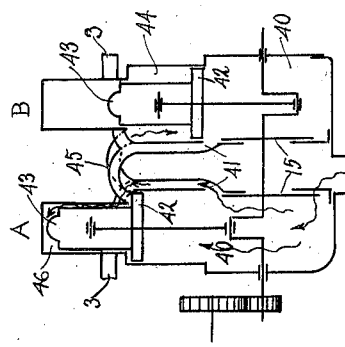
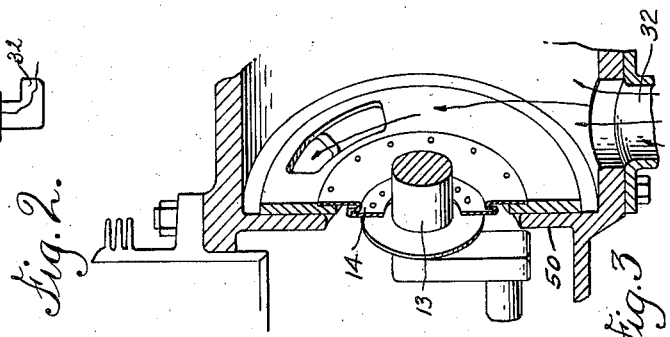
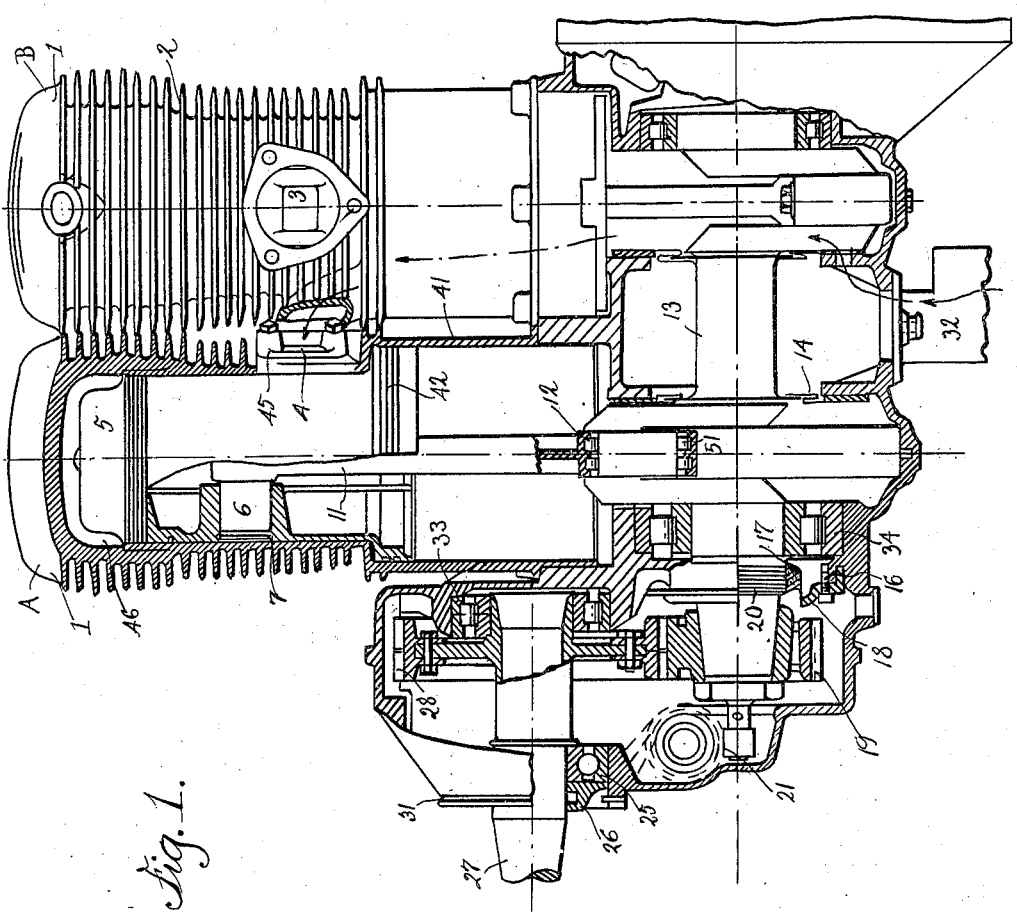
Inventor:
Edward Kottsieper
by George Francis Myers
his Attorney Patented July 19, 1938

2,124,196

UNITED STATES PATENT OFFICE 2,124,196

ENGINE

Edward Kottsieper, Bridgeport, Conn.

Application May 18, 1933, Serial No. 671,705

5 Claims. (Cl. 123—73)

This invention relates to engines, and particularly to that type of engine known as the internal combustion engine.

It has for its object to produce an engine that is more efficient and cheaper to manufacture than the present engines.

A further object is to produce a two-cycle engine that is especially suitable for aircraft on account of having supercharging features embodied in the engine construction so that high flying altitudes may be obtained and maintained.

Another object is to construct a two-cycle engine having disc valves.

Another object is to produce a two-cycle engine that will overcome the gas leakage between chambers by means of self adjusting groove packages.

A still further object of the invention is to produce a gear reduction element comprising staggered helico gears which combined form a herring bone gear.

With the above and other objects in view, the invention consists in the novel construction, combination and arrangement of parts as herein described, illustrated and claimed:

In the accompanying drawing, where like symbols of reference represent corresponding parts in the views:

Figure 1 is a side elevation partly broken away and partly in section of a preferred embodiment of the invention; and Fig. 2 is a diagrammatic sketch showing the engine cycle; and Fig. 3 is a view of the disk valve in the crank case, including the connection of the disk by means of the diaphragm to the crank shaft.

The invention is constructed and operated substantially and preferably as follows:

1 is the cylinder head, 2 the cylinder barrel, 3 the exhaust port, 4 the cylinder port connection. 5 is the piston, 6 is the wristpin and 7 the wristpin lock. 11 is the connecting rod, 12 the connecting rod roller bearing, 13 the crank shaft, 14 the valve diaphragm, 15 the valve disc, 16 the packing disc lock screw, 17 the packing felt and 18 the packing disc. 19 is the small herring bone gear, 20 the crank shaft (packing) grooves, 21 the tachometer drive. 25 is the propeller thrust bearing, 26 the propeller shaft packing ring, 27 the propeller shaft, and 28 the large herring bone gear. 29 is the hand starter, 30 the ignition unit. 31 is the propeller shaft packing lock ring and 32 the carburetor. 33 is the propeller shaft bearing, 34 the crank shaft bearing. 40 is the crank case compression chamber, 41 is the vertical port. 42 is the large part of the piston, that is, the part of greater diameter, and 43 is the small part of the piston; 44 is the ring area, 45 is where the ports cross and 46 is the explosion chamber.

The cycle of the engine is more particularly shown in Fig. 2. The gas is taken in from the carburator 32 into the crank case chamber 40 through the disc valve 15 when the large part of the piston 42, in cylinder A is on its up stroke. At the same time the gas fills up the ring area 44 of the down coming piston 42 of cylinder B through the vertical port 41 of cylinder A. Both ports 41 cross one another at 45 as shown.

On the down stroke of 42 in cylinder A the gas in 40 is compressed and travels up through the port 41 into the explosion chamber 46. Simultaneously the piston in cylinder B on its up stroke compresses the gas in the ring 44 pressing the same into the said explosion chamber 46 in the cylinder A. Also the piston of cylinder B takes in gas on its upstroke as described above for cylinder A.

Since 42 is of greater diameter than 43 the supercharging of the engine will amount to twice the difference between their diameters. That is the gas that was compressed by the piston 42 in cylinder A, and the gas that was in the ring area 44, is now all in the explosion chamber 46.

When the engine is operating at sea level, or when it is not necessary to supercharge, the carburator is throttled down to fill the chambers 42 and 44 just enough to give the requisite amount necessary for the explosion chamber 46.

The disc valve 15 is properly timed to give sufficient opening at the suction stroke, and is closed perfectly air tight during the compression. This valve has a slot which registers with a similar slot in the crank case wall 50. The disc 15 is connected to the crank shaft 13 by means of the diaphragm 14 to permit side motion of the disc and take up the wear.

The crank shaft packing 17, of packing material as felt, prevents the compressed gas from entering the gear chamber or the starter box. The packing material is pressed into the crank shaft grooves 20 by means of the flexible packing disc 18 and produces a multiple packing. The packing disc 18 is made of thin flexible sheet material, and is held down by screws 16. These screws give the packing disc a resilient pressure against the felt 17.

The gear reduction 19 and 28 is of the double staggered herring boned gear construction to give smooth and noiseless operation.

In the roller bearing 12, the rollers 51 run direct on the hardened crank shaft 13 and are spaced by split duraluminum roller cages.

As my invention is in some of its aspects generic I do not limit myself to the particular construction shown and described, but also contemplate the employment of such equivalents for the several elements as fairly fall within the scope of the claims.

In this connection I may state that the engine is generally built in multiples of two cylinders; and is adaptable to the Diesel principle, or semi-Diesel.

Therefore it should be understood that various changes may be made in the form, proportion, size and detail of the several structures shown, as well as the number and position of certain elements used, without departing from the spirit of the invention.

I claim:

1. The combination with a two-cycle engine, of a crank case having a wall therein, a crank shaft mounted adjacent to the wall, a disc mounted concentric with the crank shaft and lying flat against the wall, a resilient connection between the shaft and the disc, and means for drawing the disc away from the wall during one stroke of the engine.

2. The combination with a two-cycle engine, of a crank case having a wall therein, a crank shaft mounted adjacent to the wall, a disc mounted concentric with the crank shaft and lying flat against the wall, a resilient connection between the shaft and the disc, and means for drawing the disc away from the wall during one stroke of the engine and pressing the disc against the wall airtightly during the other stroke thereof.

3. The combination with a two-cycle engine, of a crank case having a wall therein, a crank shaft mounted adjacent to the wall, a disc mounted concentric with the crank shaft and lying flat against the wall, and a diaphragm concentric with the shaft and the disc and fastened airtightly to both of the same.

4. The combination with a two-cycle engine, of a crank case having a wall with an opening therein, a crank shaft mounted adjacent to the wall, a diaphragm fastened airtightly to the shaft, and a disc fastened airtightly to the diaphragm and having an opening therein registering with the aforesaid opening during the suction stroke.

5. The combination with a two-cycle engine, of a crank case having a wall with an opening therein, a crank shaft mounted adjacent to the wall, a diaphragm fastened aiirtightly to the crank shaft, and a disc fastened airtightly to the diaphragm and having an opening therein registering with the aforesaid opening during the suction stroke and closing airtightly during the compression stroke.

EDWARD KOTTSIEPER.